United States Patent
Arndt

[15] 3,657,650
[45] Apr. 18, 1972

[54] CURRENT AND VOLTAGE MONITORING MODULE FOR ELECTRIC CONDUCTOR TERMINATIONS

[72] Inventor: Richard H. Arndt, Lenox, Mass.
[73] Assignee: General Electric Company
[22] Filed: Sept. 8, 1969
[21] Appl. No.: 855,912

Related U.S. Application Data

[63] Continuation-in-part of Ser. No. 694,720, Dec. 29, 1967, abandoned.

[52] U.S. Cl.................................324/126, 174/18, 324/122, 324/127, 324/133, 340/252 R
[51] Int. Cl..................................G01r 1/22, G01r 19/14
[58] Field of Search..................324/126, 122, 133, 51, 127; 340/248, 252; 174/142, 143, 152, 18

[56] References Cited

UNITED STATES PATENTS

| 1,775,530 | 9/1930 | Jansson | 324/126 X |
| 3,187,282 | 6/1965 | Pierce et al. | 324/126 X |
| 3,390,331 | 6/1968 | Brown et al. | 174/143 X |
| 3,396,339 | 8/1968 | Miram | 324/126 |
| 3,471,784 | 10/1969 | Arndt et al. | 324/127 X |
| 3,513,394 | 5/1970 | Tachick | 340/248 X |
| 3,413,548 | 11/1968 | Schweitzer, Jr. | 324/51 X |

Primary Examiner—Rudolph V. Rolinec
Assistant Examiner—Ernest F. Karlsen
Attorney—Vale P. Myles, Francis X. Doyle, Frank L. Neuhauser, Oscar B. Waddell and Joseph B. Forman

[57] ABSTRACT

A monitoring module for a power conductor termination adapted to be quickly and easily placed in operating position on such a termination. The module is equipped to house either or both current and voltage monitoring means for detecting variations in current and voltage on the power conductor.

2 Claims, 6 Drawing Figures

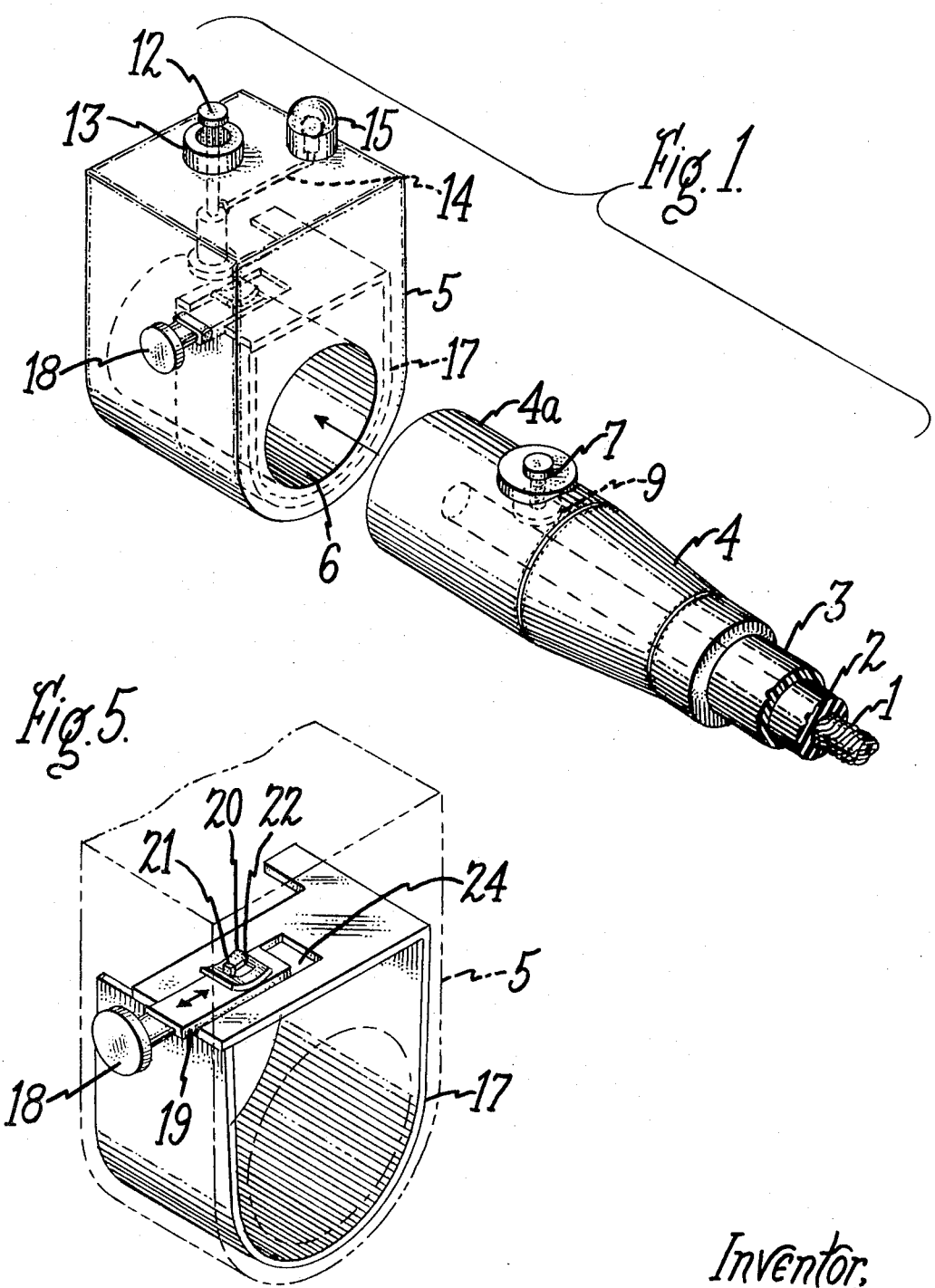

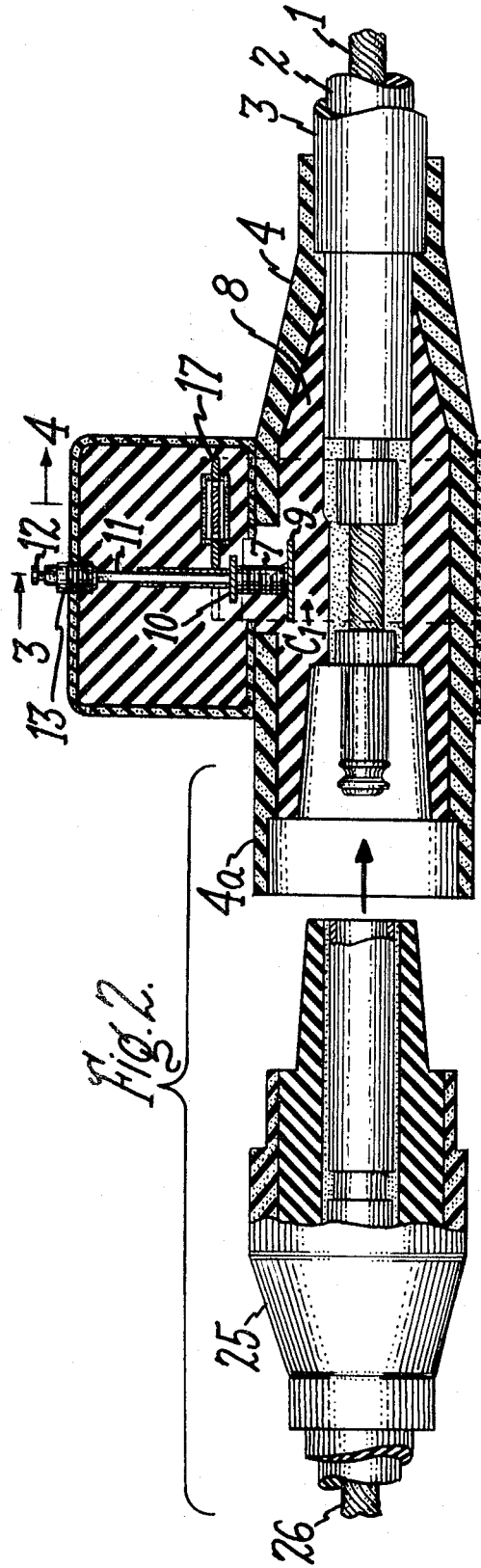
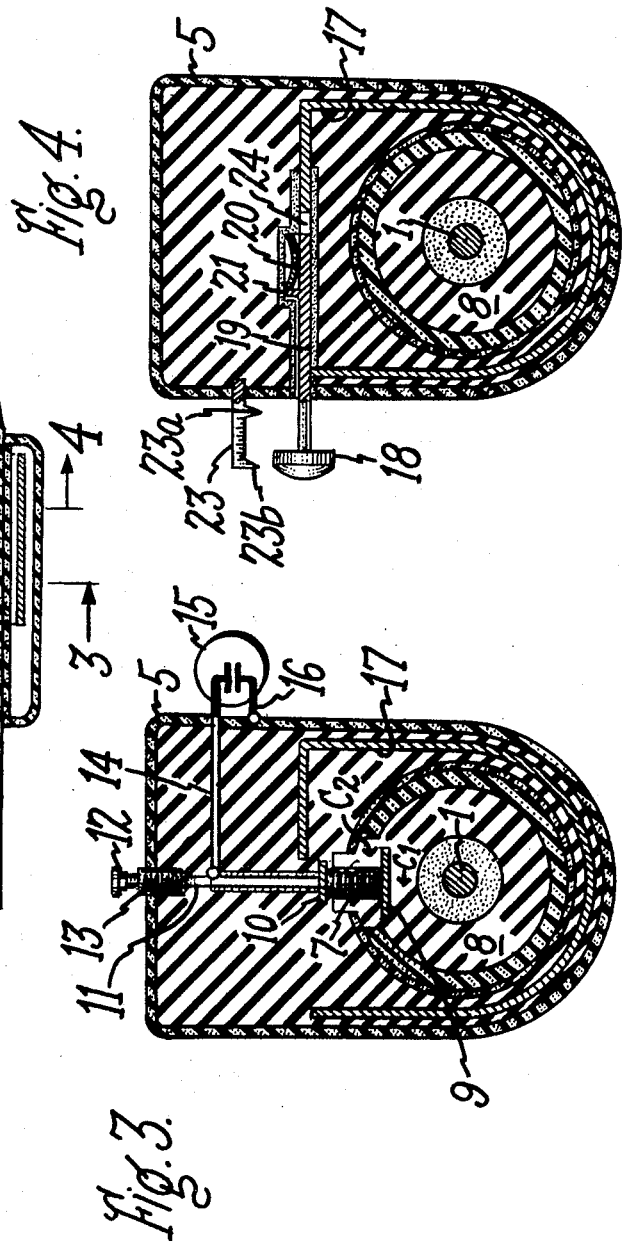

Inventor,
Richard H. Arndt,
by Vale P. Myler
His Attorney.

CURRENT AND VOLTAGE MONITORING MODULE FOR ELECTRIC CONDUCTOR TERMINATIONS

This is a continuation-in-part of U.S. Pat. application Ser. No. 694,740, now abandoned, filed Dec. 29, 1967 and assigned to the same assignee as the present invention.

In underground electric power transmission and distribution systems, the current carrying conductors are normally electrically charged at high potential relative to ground potential. Therefore, they must be completely enclosed in suitable insulation over the entire extent of the system. In such systems, the insulated power conductors interconnect various system components such as transformers, switches and junction panels. The connections between these components and the conductors are made by providing power termination assemblies on the ends of the conductors and on the respective components to which they are to be connected. Basically, such "terminations" comprise insulating and voltage grading structures adjacent the interconnected portions of the respective system elements so that safe, secure couplings between them can be made and released quickly and easily.

It has been recognized in the prior art that satisfactory operation and maintenance of underground power distribution systems require the provision of means to monitor the voltage and/or current at various locations in the system. By means of such monitoring, for example, it is possible to locate and isolate system faults so that they can be quickly remedied and normal operation restored to the system. Also, it is desirable to provide monitoring means for indicating when a given termination is at high voltage so that a lineman wishing to disconnect the terminations will be aware of the hazard that it presents and denergize that portion of the system prior to attempting to disconnect the termination.

While the need for system monitoring of underground terminations has been recognized, many underground power distribution systems have been constructed in the past without incorporating adequate monitoring facilities. And in other power systems, where some voltage and current monitoring means have been provided, they often afford very limited functions and frequently fail to incorporate desirable safety and operating features available in more recent monitoring circuits. One of the advantages of my invention is that it can be readily utilized on existing power transmission systems as well as on new systems under construction. A further advantage of the invention is that the monitoring device provided is readily portable and can be quickly and easily placed in operation on a power termination.

Thus, a primary object of the invention is to provide a compact, readily portable monitoring module for electric power conductor terminations.

Another object of the invention is to provide a monitoring module that can be quickly and easily placed in position on existing power transmission and distribution systems to afford modern monitoring facilities for these systems at a reasonable cost.

A further object of the invention is to provide a monitoring module for power transmission and distribution systems that is rugged and durable in design while being economically manufactured so that many such modules may be permanently mounted on the underground conductor terminations of a given system without unduly increasing the cost of this system.

Other objects and advantages of the invention will become apparent as it is more fully understood from the following description taken in conjunction with the accompanying drawings and its scope will be pointed out in the appended claims.

In the drawings,

FIG. 1 is a perspective view of an embodiment of a voltage and current monitoring module constructed in accordance with my invention and shown in respect to a power conductor termination on which it is adapted to be mounted.

FIG. 2 is a side elevation, partly in section, of a monitoring module mounted on a power conductor termination which is depicted in spaced relation to a second conductor termination designed to be coupled therewith.

FIG. 3 is an end cross sectional view taken through the plane 3—3 of FIG. 2 to illustrate the component parts of a voltage monitoring circuit housed within the monitoring module.

FIG. 4 is an end view in cross section taken through the plane 4—4 shown in FIG. 2 to illustrate one embodiment of a current monitoring circuit housed in the monitoring module of the invention.

FIG. 5 is a perspective view, partly in phantom, illustrating the component parts of the current monitoring embodiment depicted in FIG. 4.

Figure 6:
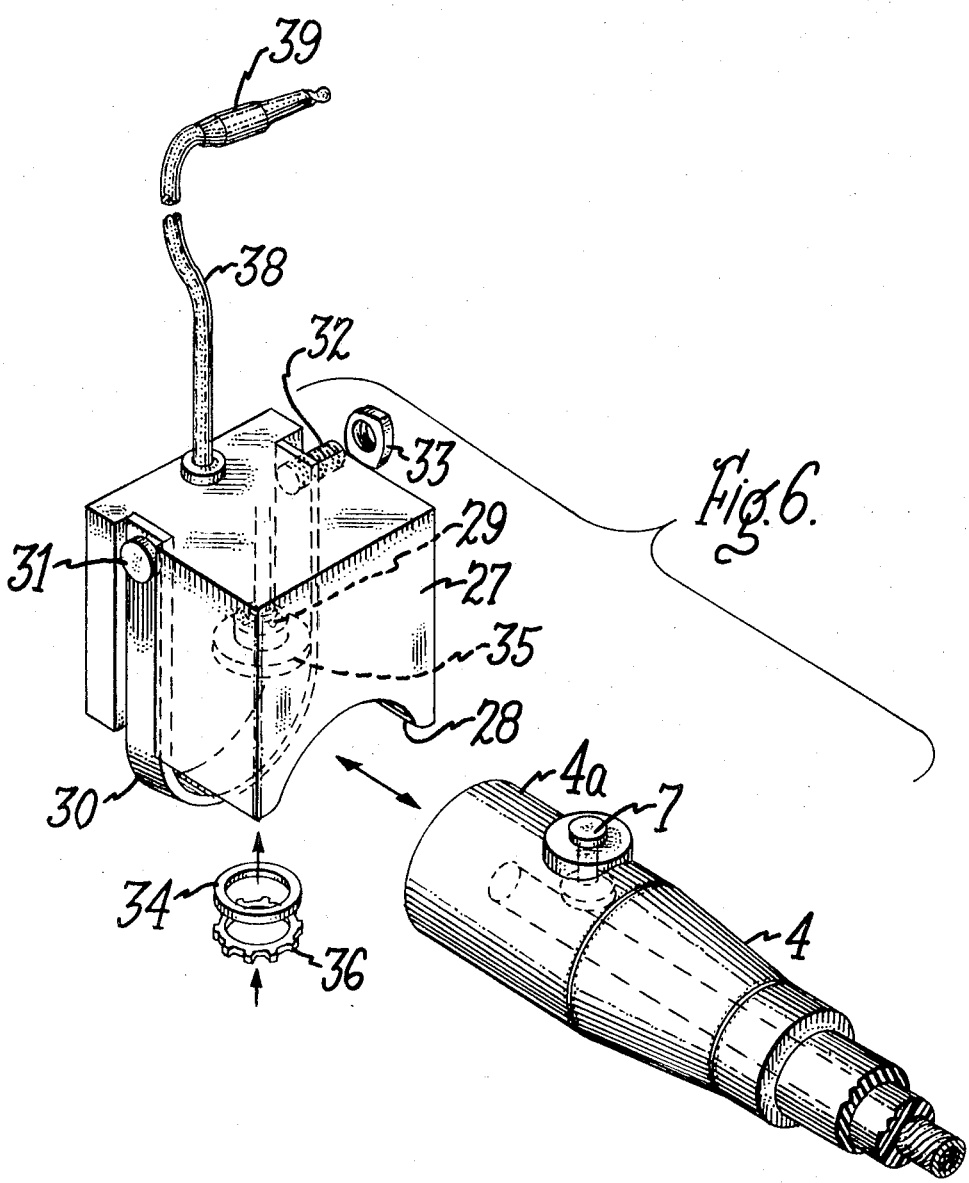
FIG. 6 is an exploded perspective view of a second embodiment of a monitor module constructed pursuant to the invention.

Referring now to FIG. 1 of the drawing, there is shown a generally cylindrical power conductor 1 sheathed in insulating material 2 which in turn is encased in a metallic shield 3. A voltage grading conductor termination 4 is fastened to the end of conductor 1 in a conventional manner. The termination 4 is formed to have a substantially cylindrical end portion 4a, which is a conventional design practice in the power distribution field. Adjacent the termination 4 is a slip-on monitor module 5 having an axial bore 6 therethrough which is substantially complementary in shape with the outer surface of the cylindrical portion 4a of termination 4. The module 5 is formed of elastomeric material and the diameter of bore 6 is slightly smaller than the diameter of cylindrical portion 4a of the conductor termination 4. Accordingly, when termination 4 is inserted into bore 6, a snug, substantially water-tight junction having a suitable voltage grading characteristic, is formed between the two members. It will be understood that the band portion of module 5, around bore 6, may be formed with an articulated piece of metal or other suitable material that can be readily fastened in a quick-detach manner to the housing portion of module 5 without departing from the invention.

The monitoring module 5 houses with it means for monitoring current passing through conductor 1, means for monitoring the voltage on conductor 1, and interrogation means for verifying the operability of the voltage monitoring means. It will be understood that various devices and circuit arrangements can be employed to provide the monitoring and indicating functions afforded by the means illustrated in the preferred embodiment of my invention without departing from the scope of the invention. However, in illustrating a preferred embodiment of the invention I have selected relatively simple component parts and circuits of suitably rugged design to reliably provide the desired functions under typically adverse ambient conditions present in underground power distribution systems.

The monitoring and indicating means shown partly in phantom in FIG. 1 will be described with reference to FIGS. 2, 3, 4 and 5 in which the component parts of these means are more clearly illustrated. Like reference numerals are used throughout all of the figures of the drawings to identify like parts. Referring first to FIGS. 2 and 3, wherein the component parts of a voltage monitoring means are illustrated, there is shown an electrical contact 7 embedded in insulating material 8 and electrically connected to a metallic disc 9. The disc 9 acts as a capacitor, illustrated diagrammatically as $C_1$, with the power conductor 1 and the dielectric material of insulator 8. It will be noted that the insulating material 8 also surrounds the contact 7 to insulate it from the outer surface of termination 4, which is at ground potential. Contact 7 is shown in engagement with a second contact 10 that is mounted in module 5 and electrically connected by conductor 11 to an exterior terminal 12. The terminal 12 is supported on module 5 and insulated from the conductive outer surface thereof in any conventional manner, such as by screwing a supporting bushing 13 into the outer surface of module 5 as shown in FIGS. 2 and 3. Contact 10 must be aligned with contact 7 when termination 4 is fitted into module 5 in the manner shown to render the voltage indicating circuit operable. The remainder of the voltage monitoring circuit comprises a conductor 14 electrically connected between contact 10, via conductor 11, and one side of a glow discharge lamp 15. The other conducting terminal of lamp 15 is connected by conductor 16 to the outer surface of module 5. It will be understood that the outer surface of module 5 is preferably formed of electrically conductive material, elastomeric, while the interior area of the module 5 is filled with insulating elastomeric material. Thus when module 5 is in operating position on termination 4, the ground potential outer surface of termination 4 contacts the outer conductive surface of module 5 and the grounded shield 3 so all of these elements are maintained at ground potential. Accordingly, it will be seen that lamp 15 is electrically connected across a capacitance shown diagrammatically as $C_2$, which is formed between disc 9 and the grounded shield 3 that is directly connected to the outer ground potential surface of module 5.

In operation, when a voltage is present on conductor 1, that voltage is distributed across capacitances $C_1$ and $C_2$, so that the voltage across $C_2$ is a small fraction of the conductor voltage. The lamp 15 has a voltage rating corresponding to the voltage developed across $C_2$; i.e. between disc 9 and the outer surface of module 5. Thus, when lamp 15 is lit, it indicates the presence of operating voltage on conductor 1 and the lineman noting this condition can take normal precautionary measures before attempting to work on the system. Of course, if lamp 15 is not lit, that condition should indicate that conductor 1 is de-energized; however, it is possible that lamp 15 may simply have burned out and thus would fail to indicate the presence of a voltage on conductor 1. In order to verify the operability of lamp 15, a test voltage can be applied across the lamp 15 by connecting a battery or other suitable voltage source (not shown) across the interrogation terminal 12 and the outer surface of module 5. When such a test voltage is connected to terminal 12, current flows through conductors 11 and 14 to lamp 15 and then to ground through conductor 16. If lamp 15 does not light when the interrogation circuit is energized, it is proof that the lamp has failed and therefore it cannot be concluded that conductor 1 is not energized.

Referring now to FIGS. 4 and 5, there is shown the component parts of a current monitoring means comprising a generally circular band 17 which is electromagnetically coupled with the axial conductor 1 to concentrate magnetic flux developed by current in the conductor 1. A manually operable button 18 is positioned on a slidably mounted metallic plate 19 which is spring loaded by leaf spring 20 and provided with an integral projection 21 which is adapted to engage opposite ends of slot 22 in leaf spring 20 when the plate 19 is moved transversely with respect to the circular band 17. A position indicating scale 23 may be mounted on module 5 adjacent the button 18 to indicate the two respective limiting positions that the button 18 can attain when plate 19 is moved to the limits defined by detent 21 and slot 22.

In operation, the current indicating means illustrated in FIGS. 4 and 5 provides an indication of a predetermined magnitude of current in conductor 1 when plate 19 and its attached button 18 are moved axially so that button 18 is adjacent the innermost position marking 23a on scale 23. It will be understood that when current flows in conductor 1, a magnetic field is established around the conductor 1 and flux from this field is concentrated in the circular band 17. The band 17 and plate 19 form a complete magnetic path when plate 19 is moved into contact with both ends of band 17. However, when plate 19 is moved, manually, so that one of its ends is out of contact with the innermost end of band 17, the magnetic path formed by these members is interrupted by gap 24. In designing the current monitoring means, leaf spring 20 is selected to have a biasing force of predetermined value such that a predetermined magnitude of current will be required in conductor 1 to establish a magnetic field strong enough to move plate 19 and button 18 transversely to close the gap 24 in the magnetic circuit and thereby indicate the presence of past occurrence of such a magnitude of current in conductor 1. To reset the current indicating circuit, button 18 is manually moved to its outermost position marking 23b with respect to scale 23. Of course, it will be understood that other types of indicating arrangements can be used without departing from the scope of my invention. For example, magnetic and capacitance sensing means and electric circuitry similar to that disclosed and claimed in my co-pending U.S. Pat. application, Ser. No. 578,196, now U.S. Pat. No. 3,524,133, filed Sept. 9, 1966 and assigned to the same assignee as the invention disclosed herein, may be mounted by being molded in place or otherwise suitably positioned in module 5 and connected to contact 10 so that the circuitry and sensing means will perform the desired indicating functions discussed above.

From the foregoing description, a preferred embodiment of my invention and its mode of operation should be thoroughly comprehended. However, to assure a complete appreciation of the orientation of the invention with respect to power system terminations, reference is again made to FIG. 2 wherein the monitoring module 5 is mounted in operating position on a power conductor termination 4. As is common in normal power system applications, a second power termination 25 is depicted mounted on a second power conductor 26 which is slidably engageable with termination 4 as shown by the arrow in FIG. 2. When the respective termination components, 4 and 25, are engaged, an electrical circuit is completed between conductors 1 and 26 and the monitoring module 5 is secured in position to perform its circuit monitoring functions. It will be appreciated that the simplified construction and design of module 5 revealed in the preferred embodiment of the invention described herein allows it to be utilized on power terminations of existing transmission and distribution systems as well as on newly constructed systems. It will also be understood that while in the preferred embodiment of the invention the module 5 is illustrated as comprising a circular band portion with an integral eccentric outwardly extending housing that accommodates the monitoring means and interrogation means in insulated relation therein, other forms of module or fastening band may be used without departing from the scope of the invention as noted above. In addition, although the elastomeric composition of the preferred embodiment of the invention is desirably rugged and economical to manufacture, it will be understood that other materials, such as various plastics or epoxy compounds may be used to form the module of the invention.

An example of such an alternative embodiment of the invention is illustrated in FIG. 6 of the drawings. Referring to FIG. 6, there is shown a conductor termination 4 similar to the conductor termination illustrated in FIG. 1, having a capacitance tap contact 7 mounted thereon. A molded epoxy monitor module housing 27 having a surface 28 that generally compliments the curved surface 4a of termination 4 is provided with an embedded contact designated in phantom by the numeral 29, to afford a voltage sensing function. A flexible steel band 30 is mounted on threaded pins 31 and 32 which, in turn are molded into the epoxy housing 27. In operating position the steel band 30 is secured in place on the pin 32 by threaded nut 33. A water-tight seal is made around the mating contacts 7 and 29 when they are in operating position by a flexible rubber gasket 34 that is shaped to fit into a preformed recess 35 formed in the molded housing 27. A locking ring 36 is fitted into the recess 35 over the gasket 34 to retain it in position when module 27 is removed from termination 4. It will be understood that the steel band 30 acts as an electromagnetic sensing means to detect fault currents in the termination 4. Those skilled in the art will appreciate that any suitable electrical circuitry can be connected to the pins 31 and 32 and electromagnetic sensing means 30 and capacitance tap contact 29 to provide an indication of current levels and voltage on termination 4. As noted above, a suitable circuit for this function is disclosed in my co-pending application Ser. No. 578,196. Of course, if desired indicating means similar to those illustrated in FIG. 1 may be utilized in the housing 27. Finally, to provide a remote readout capability from the module 27, a cable 38 is connected to the output of the sensing circuitry in module 27 and is provided with a jack 39 on its outermost end so that the conductor 38 can be readily plugged into a visual or audio indicating mechanism to perform functions similar to the indicating means 15 and 18 discussed above with reference to FIG. 1 of the drawing.

While there has been shown and described particular embodiments of the invention, it will be obvious to those skilled in the art that various changes and modifications may be made therein without departing from the true spirit and scope of the invention.

What I claim as new and desire to secure by Letters Patent of the United States is:

1. As an accessory for a shielded concentric electric power distribution cable termination connector having an elongated central conductor and a capacitive coupling device for said conductor, a module containing voltage and current monitoring devices and visual indicating means for indicating respectively the energization of either of said devices, said devices being mounted for respective capacitive and electromagnetic coupling to said central conductor when said module is in operating position on said shielded termination, a terminal mounted on the exterior of said module and electrically connected to said indicating means thereby to afford means for verifying the operability of said indicating means by applying a test voltage to said terminal, and manually operable means for resetting said visual means for indicating energization of the current monitoring device, said module comprising a housing of elastomeric insulating material having a dilatable bore extending completely through it which in its undilated condition is smaller in diameter than the outside diameter of the shielded termination, said bore being adapted to dilate at least one-sixteenth inch at portions of its radius thereby to slidably receive said shielded termination and said capacitive coupling device therein and to form a water-tight seal between the surface of the termination and the surface of said bore when the module is in operating position, said module being further adapted to be quickly and easily removed manually from said termination by simply forcing it to slide from the termination.

2. A monitor module accessory for a shielded concentric electric power distribution cable termination connector of the type having a cylindrical body of insulation between an axial conductor and a conductive ground plane outer surface through which surface radially extends an insulated low voltage tap capacitively coupled to the axial conductor, said module comprising a releasable band fastened to an eccentric outwardly extending housing, said housing being formed of material which is conductive on the housing's outside and insulating on the housing's inside, said band comprising an electrically conductive loop having an internal diameter in its operating position that is slightly less than the outside diameter of the outer conductive surface of said termination whereby said band when mounted in operating position over said termination tightly embraces the latter, the inner surface of said housing portion having an insulated recessed contact for inter-lockingly engaging the tap contact of said termination, and a cable mounted in said housing said cable having a plug type connector at a first end and means connecting its second end to the recessed contact to form an indicating circuit means to provide a remote readout capability from the module.

* * * * *